(12) United States Patent
Swager et al.

(10) Patent No.: US 8,456,073 B2
(45) Date of Patent: Jun. 4, 2013

(54) FIELD EMISSION DEVICES INCLUDING NANOTUBES OR OTHER NANOSCALE ARTICLES

(75) Inventors: Timothy M. Swager, Newton, MA (US); Hongwei Gu, Jiangsu Province (CN)

(73) Assignee: Massachusetts Institute of Technology, Cambridge, MA (US)

( * ) Notice: Subject to any disclaimer, the term of this patent is extended or adjusted under 35 U.S.C. 154(b) by 1015 days.

(21) Appl. No.: 12/474,415

(22) Filed: May 29, 2009

(65) Prior Publication Data

US 2013/0113359 A1 May 9, 2013

(51) Int. Cl.
*G01N 31/00* (2006.01)
*G01N 21/64* (2006.01)

(52) U.S. Cl.
USPC ........... 313/309; 313/310; 313/495; 313/497; 445/23

(58) Field of Classification Search
USPC ................... 313/309–310, 495–498
See application file for complete search history.

(56) References Cited

U.S. PATENT DOCUMENTS

| | | | |
|---|---|---|---|
| 3,450,878 A | 6/1969 | Pezdirtz et al. | |
| 3,915,706 A | 10/1975 | Limburg et al. | |
| 4,616,237 A | 10/1986 | Pettigrew et al. | |
| 5,753,088 A * | 5/1998 | Olk | 204/173 |
| 6,616,497 B1 | 9/2003 | Choi et al. | |
| 6,652,958 B2 * | 11/2003 | Tobita | 428/298.1 |
| 6,705,910 B2 | 3/2004 | Sheu et al. | |
| 6,902,658 B2 | 6/2005 | Talin et al. | |
| 7,014,743 B2 | 3/2006 | Zhou et al. | |
| 7,187,115 B2 * | 3/2007 | Seon | 313/496 |
| 7,365,100 B2 | 4/2008 | Kuper et al. | |
| 7,556,775 B2 | 7/2009 | McGill et al. | |
| 7,854,826 B2 | 12/2010 | So et al. | |
| 7,871,533 B1 | 1/2011 | Haiping et al. | |
| 8,187,887 B2 | 5/2012 | Swager et al. | |
| 8,212,132 B2 | 7/2012 | Swager et al. | |
| 2002/0037457 A1 | 3/2002 | Choi | |
| 2006/0057927 A1 | 3/2006 | Kang et al. | |

(Continued)

FOREIGN PATENT DOCUMENTS

| | | |
|---|---|---|
| CN | 1995143 A | 7/2007 |
| JP | 63-221278 A | 9/1988 |

(Continued)

OTHER PUBLICATIONS

International Search Report and Written Opinion for PCT/US2010/051610 mailed Mar. 5, 2012.

(Continued)

*Primary Examiner* — Tracie Y Green
(74) *Attorney, Agent, or Firm* — Wolf, Greenfield & Sacks, P.C.

(57) ABSTRACT

The present invention provides devices comprising an assembly of carbon nanotubes, and related methods. In some cases, the carbon nanotubes may have enhanced alignment. Devices of the invention may comprise features and/or components which may enhance the emission of electrons and may lower the operating voltage of the devices. Using methods described herein, carbon nanotube assemblies may be manufactured rapidly, at low cost, and over a large surface area. Such devices may be useful in display applications such as field emission devices, or other applications requiring high image quality, low power consumption, and stability over a wide temperature range.

28 Claims, 6 Drawing Sheets

U.S. PATENT DOCUMENTS

| | | | |
|---|---|---|---|
| 2006/0063464 A1* | 3/2006 | Kang et al. | 445/51 |
| 2006/0202168 A1 | 9/2006 | Barrera et al. | |
| 2007/0179272 A1 | 8/2007 | Tobe et al. | |
| 2008/0076816 A1 | 3/2008 | Bianco et al. | |
| 2008/0131658 A1 | 6/2008 | Wakharkar et al. | |
| 2008/0221240 A1 | 9/2008 | Swager et al. | |
| 2009/0058258 A1* | 3/2009 | Chang et al. | 313/497 |
| 2009/0305089 A1 | 12/2009 | Minteer et al. | |
| 2010/0179054 A1 | 7/2010 | Swager et al. | |
| 2010/0222432 A1 | 9/2010 | Hua | |
| 2011/0081724 A1 | 4/2011 | Swager et al. | |
| 2011/0089051 A1 | 4/2011 | Wang et al. | |
| 2011/0171629 A1 | 7/2011 | Swager et al. | |
| 2012/0116094 A1 | 5/2012 | Swager et al. | |
| 2012/0171093 A1 | 7/2012 | Swager et al. | |

FOREIGN PATENT DOCUMENTS

| | | |
|---|---|---|
| JP | 2008-047855 A | 2/2008 |
| WO | WO 01/10779 A1 | 2/2001 |
| WO | WO 2004/113275 A2 | 12/2004 |
| WO | WO 2006/104046 A1 | 10/2006 |
| WO | WO 2006/115486 A1 | 11/2006 |
| WO | WO 2007/033189 A1 | 3/2007 |
| WO | WO 2007/098578 A1 | 9/2007 |
| WO | WO 2007/143028 A2 | 12/2007 |
| WO | WO 2008/133779 A2 | 11/2008 |
| WO | WO 2009/136978 A2 | 11/2009 |

OTHER PUBLICATIONS

International Search Report and Written Opinion for PCT/US2010/055395 mailed Mar. 20, 2012.

Raval et al., Determining ionizing radiation using sensors based on organic semiconducting material. Appl Phys Lett. 2009;94:123304-1-123304-3.

Tang et al., Measurement of ionizing radiation using carbon nanotube field effect transistor. Phys Med Biol. Feb. 7, 2005;50(3):N23-31.

Yates et al., The absorption coefficient spectrum and radiatoin degradation of poly (butene-1 sulfone) in the soft X-ray region. J Poly Sci Part B Poly Phys. 1993;31:1837-44.

International Preliminary Report on Patentability for PCT/US2010/051610 mailed Apr. 19, 2012.

International Preliminary Report on Patentability for PCT/US2010/055395 mailed May 18, 2012.

International Search Report and Written Opinion for PCT/US2008/003180 mailed Jun. 19, 2009.

International Preliminary Report on Patentability for PCT/US2008/003180 mailed Sep. 17, 2009.

Invitation to Pay Additional Fees for PCT/US2009/001396 mailed Dec. 10, 2009.

International Search Report and Written Opinion for PCT/US2009/001396 mailed Apr. 22, 2010.

International Preliminary Report on Patentability for PCT/US2009/001396 mailed Sep. 16, 2010.

International Search Report and Written Opinion for PCT/US2009/006512 mailed Oct. 22, 2010.

International Preliminary Report on Patentability for PCT/US2009/006512 mailed Jun. 23, 2011.

Invitation to Pay Additional Fees for PCT/US2010/051610 mailed Dec. 27, 2011.

Invitation to Pay Additional Fees for PCT/US2010/055395 mailed Dec. 7, 2011.

[No Author Listed] TGP-H Carbon Fiber Paper. Toray Automotive Solutions. Toray Industries (America), Inc. Available at http://www.toray-auto.us/poductrs/carbon_papers_fuel_cells.html. Last accessed Nov. 19, 2010. 2 pages.

Albert et al., Cross-reactive chemical sensor arrays. Chem Rev. Jul. 12, 2000;100(7):2595-626.

Bai et al., Gas Sensors Based on Conducting Polymers. Sensors. 2007;7:267-307.

Becker et al., The Influence of Surface Strain on the Chemical Reactivity of Fullerene Ions: Addition Reactions with Cyclopentadiene and 1,3-cycolhexadiene. International Journal of Mass Spectrometry and Ion Processes. 1997;167/168:519-24.

Chen et al., Noncovalent functionalization of carbon nanotubes for highly specific electronic biosensors. Proc Natl Acad Sci U S A. Apr. 29, 2003;100(9):4984-9. Epub Apr. 15, 2003.

Coffey et al., Conducting Polymer/Graphite Fiber Composites for High Charge Density Battery Electrodes. Lithium batteries—Symposium. Proceedings—Electrochemical Society. New Orleans, LA. Oct. 1993. The Society. 1994;94-4:258-68.

Coffey et al., High charge density conducting polymer/graphite fiber composite electrodes for battery applications. J Electrochem Soc. 1995;142(2):321-25.

Collins et al., Extreme oxygen sensitivity of electronic properties of carbon nanotubes. Science. Mar. 10, 2000;287(5459):1801-4.

Diederich et al., Covalent Fulleren Chemistry. Science. 1996;271:317-23.

Dwyer et al., DNA-functionalized single-walled carbon nanotubes. Nanotechnology. 2002;13(5):601-04.

Giordani et al., Multifunctional hybrid materials composed of [60]fullerene-based functionalized-single-walled carbon nanotubes. Carbon. 2009;47(3):578-88.

Guo et al., Covalently bridging gaps in single-walled carbon nanotubes with conducting molecules. Science. Jan. 20, 2006;311(5759):356-9.

Hahm et al., Direct Ultrasensitive Electrical Detection of DNA and DNA Sequence Variations Using Nanowire Nanosensors. Nano Letters. 2004; 4(1):51-54.

Janata et al., Conducting polymers in electronic chemical sensors. Nat Mater. Jan. 2003;2(1):19-24.

Jung et al., Covalent attachment and hybridization of DNA oligonucleotides on patterned single-walled carbon nanotube films. Langmuir. Sep. 28, 2004;20(20):8886-91.

Kolmakov et al., Chemical Sensing and Catalysis by One-Deminsional Metal-Oxide Nanostructures. Annu Rev Mater Res. 2004;34:151-80.

Kong et al., Nanotube molecular wires as chemical sensors. Science. Jan. 28, 2000;287(5453):622-5.

Liu et al., Fullerene pipes. Science. May 22, 1998;280(5367):1253-6.

Lobez et al., Radiation Detection: Resistivity Responses in Functional Poly (Olefin Sulfone)/Carbon Nanotube Composites. Angew Chem Int Ed. 2010; 49:95-98.

Lutz, 1,3-Dipolar cycloadditions of azides and alkynes: a universal ligation tool in polymer and materials science. Angew Chem Int Ed. 2007; 46:1018-25.

Maggini et al., Addition of Azomethine Ylides to $C_{60}$: Synthesis, Characterization, and Functionalization of Fullerene Pyrrolidines. J Am Chem Soc. 1993;115: 9798-99.

McQuade et al., Conjugated Polymer-Based Chemical Sensors. Chem Rev. 2000;100:2537-74.

Moses et al., The growing applications of click chemistry. Chem Soc Rev. Aug. 2007;36(8):1249-62. Epub May 3, 2007.

O'Donovan et al., Phosphine-catalysed cycloaddition of buta-2,3-dienoates and but-2-ynoates to [60]fullerene. Chem Commun. 1997:81-82.

Park et al., Enhancement of the field-effect mobility of poly(3-hexylthiophene)/functionalized carbon nanotube hybrid transistors. Org Electon. 2008;9:317-22.

Pederson et al., Core particle, fiber, and transcriptionally active chromatin structure. Annu Rev Cell Biol. 1986;2:117-47.

Potyrailo, Polymeric Sensoir Materials: Toward an Alliance of Combinatorial and Rational Design Tools? Agnew Chem Int Ed. 2006;45:702-23.

Prato et al., Fulleropyrrolidines: A Family of Full-Fledged Fullerene Derivatives. Acc Chem Res. 1998;31(9):519-26.

Preda et al., Addition of Dihalocarbenes to Corannulene. A Fullerene-Type Reaction. Tetrahedron Letters. 2000;41: 9633-37.

Qi et al., Toward Large Arrays of Multiplex Functionalized Carbon Nanotube Sensors for Highly Sensitive and Selective Molecular Detection. Nano Lett. 2003;3(3):347-51.

Rostovtsev et al., A stepwise huisgen cycloaddition process: copper(I)-catalyzed regioselective "ligation" of azides and terminal alkynes. Angew Chem Int Ed Engl. Jul. 15, 2002;41(14):2596-9.

Santhanam et al., A chemical sensor for chloromethanes using a nanocomposite of multiwalled carbon nanotubes with poly(3-methylthiophene). Sensors and Actuators B. 2005;106:766-71.

Scott, Fragments of Fullerenes: Novel Syntheses, Structures and Reactions. Pure & Appl Chem., 1996;68(2):291-300.

Shu et al., Phosphine-catalysed [3+2] cycloadditions of buta-2,3-dienoates with [60]fullerene. Chem Commun. 1997;79-80.

Silverman, The Organic Chemistry of Drug Design and Drug Action. 2nd ed. 2004;29-32.

Snow et al., Chemical detection with a single-walled carbon nanotube capacitor. Science. Mar. 25, 2005;307(5717):1942-5.

Star et al., Electronic Detection of Specific Protein Binding Using Nanotube FET Devices. Nano Lett. 2003;3(4):459-63.

Star et al., Nanoelectronic Carbon Dioxide Sensors. Adv Mater. 2004;16(22):2049-52.

Sun et al., Functionalized Carbon Nanotubes: Properties and Applications. Acc Chem Res. 2002;35(12):1096-1104.

Swager, The Molecular Wire Approach to Sensory Signal Amplificiation. Acc Chem Res. 1998;31:201-07.

Toal et al., Polymer sensors for niroaromatic explosives detection. Mater Chem. 2006;16:2871-83.

Tombler et al., Reversible electromechanical characteristics of carbon nanotubes under local-probe manipulation. Nature. 2000;405:769-72.

Wang et al., Carbon Nanotube/Polythiophene Chemiresistive Sensors for Chemical Warfare Agents. J Am Chem Soc. 2008;130:5392-93.

Wang et al., Novel multicomponent reaction of [60]fullerene: the first example of 1,4-dipolar cycloaddition reaction in fullerene chemistry. Org Biomol Chem. 2006;4:4063-64.

Wei et al., Covalent functionalization of single walled carbon nanotubes and fullerences via a switterion approach. Chemical Abstracts. 2007. 2 pages.

Wei et al., Multifunctional chemical vapor sensors of aligned carbon nanotube and polymer composites. J Am Chem Soc. Feb. 8, 2006;128(5):1412-3.

Weizmann et al., DNA-CNT nanowire networks for DNA detection. J Am Chem Soc. Mar. 16, 2011;133(10):3238-41. Epub Feb. 22, 2011.

Zaharescu et al., Electrical properties of polyolefin blends under γ-radiation exposure. ICSD 2004. Proceedings of the 2004 Inter National Conference on Solid Dielectrics. Toulouse, France. Jul. 5-9, 2004. IEEE. Jul. 5, 2004;1:367-69.

Zhang et al., Electochemically Functionalized Single-Walled Carbon Nanotube Gas Sensor. Electroanalysis. 2006;18(12):1153-58.

Zhang et al., Functionalization of single-walled carbon nanotubes and fullerenes via a dimethyl acetylenedicarboxylate-4-dimethylaminopyridine zwitterion approach. J Am Chem Soc. Jun. 27, 2007;129(25):7714-5. Epub Jun. 2, 2007.

Zhang et al., Modular Functionalization of Carbon Nanotubes and Fullerenes. J Am Chem Soc. 2009;131:8446-54.

Baughman et al., "Carbon Nanotubes—The Route Toward Applications," *Science* 2002, 297, 787-792.

Chen et al., "Dissolution of Full-Length Single-Walled Carbon Nanotubes," *J. Phys. Chem. B* 2001, 105(13), 2525-2528.

Kamat et al., "Self-Assembled Linear Bundles of Single Wall Carbon Nanotubes and Their Alignment and Deposition as a Film in a dc Field," *J. Am. Chem. Soc.* 2004, 126(34), 10757-10762.

Khare et al., "Carbon Nanotube Based Composites—A Review," *Journal of Minerals & Materials Characterization & Engineering* 2005, 4(1), 31-46.

Serp et al., "Carbon Nanotubes and Nanofibers in Catalysts," *Applied Catalysis A: General* 2008, 253, 337-358.

Tasis, et al. "Chemistry of Carbon Nanotubes" *Chem. Rev.* 2006, 106, 1105-1136.

Zhang et al., "Covalent Functionalization of Singled Walled Carbon Nanotubes and Fullerenes Via a Zwitterion Approach," *Prepr. Pap.-Am. Chem. Soc., Div. Fuel Chem*. 2007, 52(1), 126-128.

Zhou et al., "A New Method for the Functionalization of [60] Fullerene: An Unusual 1,3-Dipolar Cycloaddition Pathway Leading to a $C_{60}$ Housane Derivative," *Org. Lett*. 2005, 7(26), 5849-5851.

Georgakilas et al., Organic functionalization of carbon nanotubes. J Am Chem Soc. Feb. 6, 2002;124(5):760-1.

Kubat et al., Degradation of pyrene by UV radiation. Journal of Photochemistry and Photobiology A: Chemistry. 2000;132:33-36.

\* cited by examiner

FIB. 3B

FIELD EMISSION DEVICES INCLUDING NANOTUBES OR OTHER NANOSCALE ARTICLES

STATEMENT REGARDING FEDERALLY SPONSORED RESEARCH OR DEVELOPMENT

This invention was made with the support under the following government contract: N000140310897 awarded by the Office of Naval Research. The government has certain rights in the invention.

FIELD OF THE INVENTION

The present invention relates to devices comprising carbon nanotubes including field emission devices, and related methods.

BACKGROUND OF THE INVENTION

A field emission device (FED) is generally considered to be a device in which an electron beam is focused between two electrodes, producing a field emission. Typically, the FED may include an electron-emitting material and a light-emitting material. Application of a voltage across the electrodes can cause an emission of electrons from electron-emitting material, which may be used to excite the light-emitting material, resulting in a field emission. Generally, the efficiency of electron emission may depend on the material utilized as the electron emitter. Some examples of such materials include silicon, molybdenum, and diamond. Such devices have been useful in various display applications.

Recent studies have focused on the use of carbon nanotubes as an electron emitting source in FEDs. Carbon nanotubes generally have a cylindrical shape and may emit electrons from their termini, making the ability to modulate the orientation of carbon nanotubes in a device desirable in some cases. Although methods have been utilized to incorporate carbon nanotubes within FEDs, current technology may have some limitations. For example, one method involves patterning a catalyst material on a surface to catalyze growth of carbon nanotubes directly on the surface. While this may allow for control over the average orientation of the nanotubes on a surface, fabrication may be high in cost. Also, growth of carbon nanotubes over a large surface area can be difficult due to incompatibility between the stability of the substrate material and the conditions required for carbon nanotube growth. Another method may involve mixing carbon nanotubes with an adhesive, binder, resin, or other filler material, followed by screen printing the mixture on a surface. However, using this method, it may be difficult to control the density and orientation of the carbon nanotubes in the resulting structure. Also, the filler material may reduce the lifetime and stability of the carbon nanotubes.

Accordingly, improved methods are required.

SUMMARY OF THE INVENTION

The present invention relates to devices comprising carbon nanotubes including field emission devices, and related methods. The subject matter of the present invention to involves, in some cases, interrelated products, alternative solutions to a particular problem, and/or a plurality of different uses of one or more systems and/or articles.

In one embodiment, a method of generating an emission comprises providing a field emission device comprising an electrode having a surface, and a plurality of carbon nanotubes in electrical communication with the surface, the carbon nanotubes supported by a polymer support material and in substantial alignment with each other with their major axis in non-parallel relation to the electrode surface, and generating a field emission signal from the electrode.

In another embodiment, an electrode for a field induced emission device comprises an electrode comprising an assembly of carbon nanotubes and a polymer support material integrally connected to at least a portion of the carbon nanotubes such that the carbon nanotubes are substantially contained within the polymer support material, wherein, upon application of an electric field, the device exhibits a conductivity at least five times lower than in an essentially identical device lacking the polymer, under essentially identical conditions.

In yet another embodiment, a method of forming an assembly of carbon nanotubes on a surface of a substrate comprises providing a mixture comprising carbon nanotubes and a precursor of a polymer support material for the carbon nanotubes, contacting a substrate with the mixture, exposing the mixture, on the substrate, to an electric field that orients the carbon nanotubes, and forming the assembly on the surface of the substrate, comprising the carbon nanotubes supported by the polymer support material in an orientation wherein the long axes of the carbon nanotubes are substantially aligned and non-parallel to the surface of the substrate, wherein the polymer support material comprises a conducting polymer.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

FIG. 3 shows (a) the top view and (b) side view of formation of an assembly of carbon nanotubes on a substrate surface.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present invention generally relates to assemblies of carbon nanotubes, and related methods and devices.

In some embodiments, the present invention provides methods for forming an assembly of carbon nanotubes on a surface. The carbon nanotube assembly may exhibit enhanced properties, such as improved alignment of carbon nanotubes and/or enhanced emission of electrons. Assemblies of carbon nanotubes as described herein may be useful in various applications, for example, as electron-emitting materials in field emission devices. Using methods described herein, formation of carbon nanotube assemblies may be easily controlled over a large surface area (e.g., greater than several $cm^2$). The carbon nanotube assemblies may also be manufactured rapidly and at low cost.

The present invention may also provide devices (e.g, field emission devices) capable of exhibiting enhanced emission of electrons, often at lower operating voltages (e.g., ~10 V, in some cases). As used herein, a "field emission" or a "field induced emission" is given its ordinary meaning in the art and refers to an emission of electrons generated by an electric field. Devices of the invention may comprise features and/or components which may improve the ability of the device in producing an emission of electrons. For example, the devices may include an electron-emitting material and at least one component which interacts with electron emitting material to produce an efficient and/or highly focused beam of electrons. In some cases, the invention may also provide devices having a simplified electrode configuration, allowing for incorporation of the electrodes into a broader range of devices. For example, many known field emission devices may require an electron-emitting material to be placed on a rigid substrate. By contrast, some embodiments of the invention may be placed on one or more flexible substrates including plastic or polymer substrates. Devices and methods of the invention may be useful in display applications requiring high image quality, low power consumption, and stability over a wide temperature range.

Figure 1:
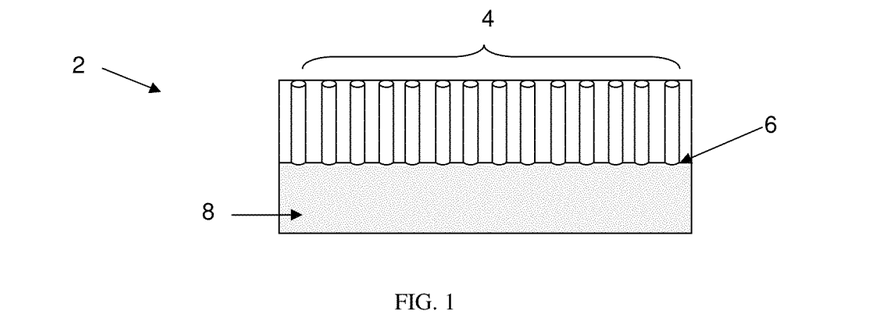
FIG. 1 shows an assembly of carbon nanotubes formed on a substrate, according to one embodiment of the invention.

In some cases, the present invention provides devices (e.g., electrodes) comprising an assembly of carbon nanotubes formed on a substrate. As used herein, the term "assembly of carbon nanotubes" refers to a plurality of carbon nanotubes arranged together in a substantially similar orientation and/or on the same surface. FIG. 1 shows an illustrative embodiment of a device of the invention, wherein device 2 comprises an to assembly of nanotubes 4 formed on a surface 6 of substrate 8. As used herein, the term "carbon nanotube" is given its ordinary meaning in the art and refers to a substantially cylindrical molecule comprising a fused network of aromatic rings, including six-membered rings. In some cases, carbon nanotubes may be useful as electron emitting materials in devices (e.g., field emission devices) due to their electronic properties and/or molecular size/shape. For example, a carbon nanotube may have a narrow end or tip such that, in the presence of an electric field, the carbon nanotube may emit a beam of electrons primarily from its end or tip. The large aspect ratio of carbon nanotubes may allow for alignment of the carbon nanotubes in a particular orientation, such that a beam of electrons emitted by the carbon nanotubes may be focused and contained, for example, between two electrodes. Additionally, carbon nanotubes may exhibit high temperature stability, chemical stability, and electrical and thermal conductivity.

In some embodiments, the carbon nanotubes may be oriented such that the emission of electrons by the assembly may be enhanced. For example, the carbon nanotubes may be substantially aligned in an orientation to provide a highly focused and efficient electron-emitting material upon exposure to an electric field, as electrons may be primarily emitted from the termini of the carbon nanotubes. In some cases, the orientation of the carbon nanotubes may be substantially planar with respect to the surface of the substrate, i.e., substantially parallel with respect to the surface of the substrate. In some cases, the orientation of the carbon nanotubes may be substantially non-planar with respect to the surface of the substrate. That is, the long axes of the carbon nanotubes may be substantially aligned and oriented non-parallel to the surface of the substrate. In some cases, the carbon nanotubes may be aligned in an orientation that is substantially perpendicular to the surface of the substrate, as shown in FIG. 1. In some cases, the carbon nanotubes may be oriented such that their termini are directed towards a luminescent material in a field emission device, as described more fully below.

Additionally, individual carbon nanotubes may be appropriately spaced and/or separated to increase efficiency of electron emission and/or field emission. For example, the device may also comprise a support material (e.g., a polymer support material) integrally connected to at a least a portion of the carbon nanotubes such that the carbon nanotubes are substantially contained within the support material. As used herein, the term "integrally connected," when referring to two or more objects, means objects that do not become separated from each other during the course of normal use, e.g., separation requires at least the use of tools, and/or by causing damage to at least one of the components, for example, by breaking, peeling, dissolving, etc. The support material may serve to substantially separate individual carbon nanotubes from one another, such that a majority of the carbon nanotubes do not contact an adjacent carbon nanotube. In some embodiments, the support material may also maintain the alignment of the carbon nanotubes in a particular orientation, such as an orientation that is non-planar with the surface of the substrate. In some cases, the support material may form a coating on a carbon nanotube, and an assembly of such coated carbon nanotubes may be formed. In some cases, the support material may be a polymer support material, wherein the polymer support material provides a matrix in which the aligned carbon nanotubes are dispersed. In some cases, at least 25% of carton nanotubes substantially contained within this polymer support do not contact other carbon nanotubes. In some cases, at least 50%, at least 75%, or, in some cases, at least 90% of carbon nanotubes substantially contained within the polymer support material do not contact other carbon nanotubes. In other cases, the support material may be an inorganic support material.

The support material (e.g., polymer support material) may further enhance the electrochemical properties of the device. For example, the carbon nanotubes may be sufficiently dispersed such that, upon application of an electric field, the carbon nanotubes may emit electrons from their termini to produce an enhanced field emission. In some cases, a polymer support material may also act as an ionizable medium capable of interacting with the carbon nanotubes to generate a field emission, including a continuous field emission. For example, the polymer support material may comprise a conducting polymer or a conjugated polymer such that, upon exposure to an electric field, the carbon nanotubes may inject charge into the polymer support material, i.e., may ionize the polymer support material, thereby enhancing the ability of the device to generate a continuous emission of electrons. Examples of conducting polymers include pi-conjugated polymers, such polythiophene or a substituted derivative thereof. In some embodiments, the polymer is poly(3-hexylthiophene).

Application of an electric field to devices described herein may result in enhanced electrochemical properties, including enhanced emission of electrons, relative to the electrochemical properties of essentially identical devices lacking the polymer support material, under essentially identical conditions. Without wishing to be bound by theory, the enhancement in performance for devices described herein may be associated with the improved alignment of carbon nanotubes on the substrate and/or the homogeneous dispersion (e.g., separation) of individual carbon nanotubes from one another within the device. Devices having such alignment and/or homogeneous dispersion of carbon nanotubes may exhibit a relatively lower conductivity than an essentially identical device lacking the polymer support material, under essentially identical conditions. In some cases, upon application of an electric field, the device may exhibit a conductivity at least 5 times lower than the conductivity of an essentially identical device, lacking the polymer, under essentially identical conditions. In some cases, the device may exhibit a conductivity at least 25 times lower, at least 50 times lower, or, in some cases, at least 100 times lower than in an essentially identical device lacking in the polymer, under essentially identical conditions. In some cases, the device may be capable of generating a continuous field emission.

Device (e.g., electrodes) of the invention may be arranged in various device configurations, including under reduced pressure (e.g., vacuum) or in the presence of a fluid, such as a liquid or a gas, to produce a stable, persistent field emission. For example, an electrode comprising an assembly of carbon nanotubes as described herein may be immersed in a liquid, such as an aromatic solvent, halogenated solvent, amine, or the like. Devices of the invention may also be in contact with an atmosphere of a gas. For example, an electrode comprising an assembly of carbon nanotubes as described herein may be contacted by, or, in some cases, immersed within, a gaseous environment (e.g., may be surrounded by an atmosphere of a gas), such as an inert gas. Examples of suitable gases include noble gases, for example, helium, neon, argon, krypton and/or xenon. In a specific embodiment, the gaseous atmosphere comprises argon, krypton and/or xenon. In some cases, the gas may be nitrogen. In one set of embodiments, the electrode is contacted by and/or immersed within a gas comprising at least 90% inert gas, or at least 95%, 98%, 99%, or 99.9% inert gas. In some cases, the fluid may be substantially free of water and/or oxygen. For example, in some cases, the fluid may be at least about 90%, at least about 95%, at least about 97%, at least about 98%, at least about 99%, at least about 99.9%, and the like, free of water and/or oxygen.

The present invention may also provide methods of forming an assembly of carbon nanotubes on a surface of a substrate. The assembly may be formed over a surfaces having a wide range of surface area. In some cases, the method may allow for facile and rapid deposition of carbon nanotubes over a large surface area, i.e., several $cm^2$ or more. In some cases, the assembly of carbon nanotubes may formed over a surface area of 1 $cm^2$, 10 $cm^2$, 100 $cm^2$, 1000 $cm^2$, or greater. In some cases, the method may also allow for formation of the carbon nanotube assembly over a small surface area, including 100 $microns^2$ or less, 50 $microns^2$ or less, 10 $microns^2$ or less, or, in some cases, 5 $microns^2$ or less. Methods of the invention may also provide carbon nanotubes assemblies having improved alignment and enhanced emission of electrons. The method may comprise providing a mixture comprising carbon nanotubes and a polymer support material, or precursor thereof. In some cases, the mixture may be formed by combining carbon nanotubes with a precursor of the polymer support material and at least one fluid carrier. The mixture may be a solution, suspension, dispersion, or the like.

Figure 2:
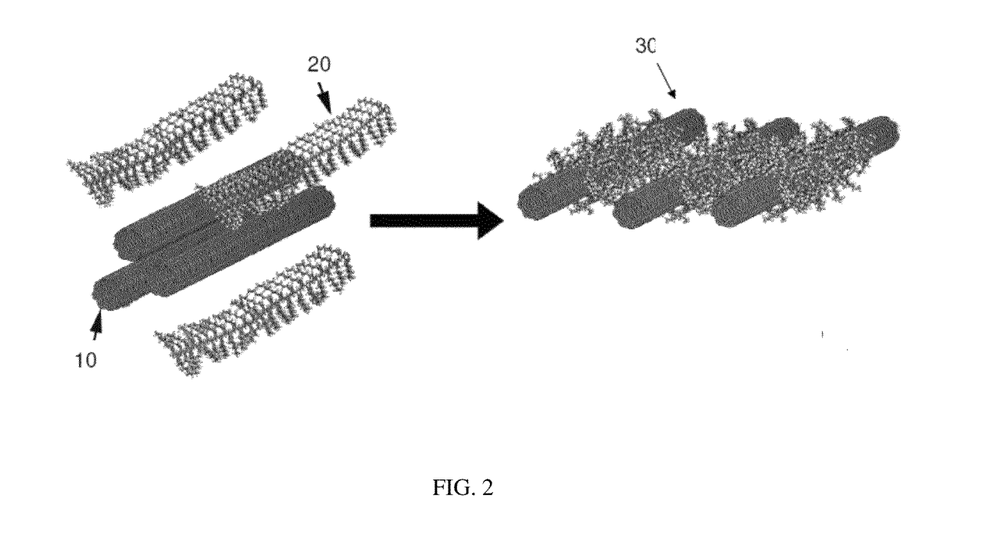
FIG. 2 shows the combination of carbon nanotubes with a polymer to produce polymer-coated carbon nanotubes.

In some embodiments, the precursor of the polymer support material may be a material (e.g., polymer, monomer) capable of interacting with the carbon nanotubes. For example, as shown in FIG. 2, a carbon nanotube 10 and a polymer 20 may be combined to form a mixture, wherein polymer 20 binds to or otherwise associates with carbon nanotube 10 to form a coated carbon nanotube 30. The precursor of the polymer support material may interact with the carbon nanotubes via a bond, including a covalent bond (e.g. carbon-carbon, carbon-oxygen, oxygen-silicon, sulfur-sulfur, phosphorus-nitrogen, carbon-nitrogen, metal-oxygen or other covalent bonds), an ionic bond, a hydrogen bond (e.g., between hydroxyl, amine, carboxyl, thiol and/or similar functional groups, for example), a dative bond (e.g. complexation or chelation between metal ions and monodentate or multidentate ligands), or the like. The interaction may also comprise Van der Waals interactions or a binding event between pairs of molecules, such as biological molecules, for example.

The method may then comprise contacting the mixture with a substrate. In some cases, the contacting may comprise immersion of at least a portion of the substrate in the mixture. In some cases, the contacting may comprise placing a small amount of the mixture (e.g., a droplet) on a surface of the substrate. In some cases, the mixture may be flowed over the surface of the substrate, contacting the substrate. Exposure of the mixture on the substrate to an electric field may then orient the carbon nanotubes.

In the presence of the electric field, an assembly of carbon nanotubes may be formed on the surface of the substrate, such that the carbon nanotubes are aligned in an orientation non-parallel to the surface of the substrate. For example, the carbon nanotubes may be aligned in an orientation substantially perpendicular to the surface of the substrate. The polymer support material, or precursor thereof, may structurally aid in the formation of the assembly by filling in the space between the aligned carbon nanotubes such that the nanotubes may retain their orientation upon removal of the electric field. In case where the precursor is a prepolymer material, the method may further comprise at least partially polymerizing the prepolymer material, thereby forming the assembly. The prepolymer material may be a monomer, or a polymer comprising reactive groups including crosslinking groups. In other cases, the method may further comprise additional steps to further treat the assembly. For example, additional steps may comprise annealing, coating, chemical functionalization, and the like. In an illustrative embodiment, the mixture may comprise carbon nanotubes coated with the precursor of the polymer support material, as described herein, and, upon formation of the carbon nanotube assembly on the substrate, the coating may serve as the polymer support material.

Figure 3A:
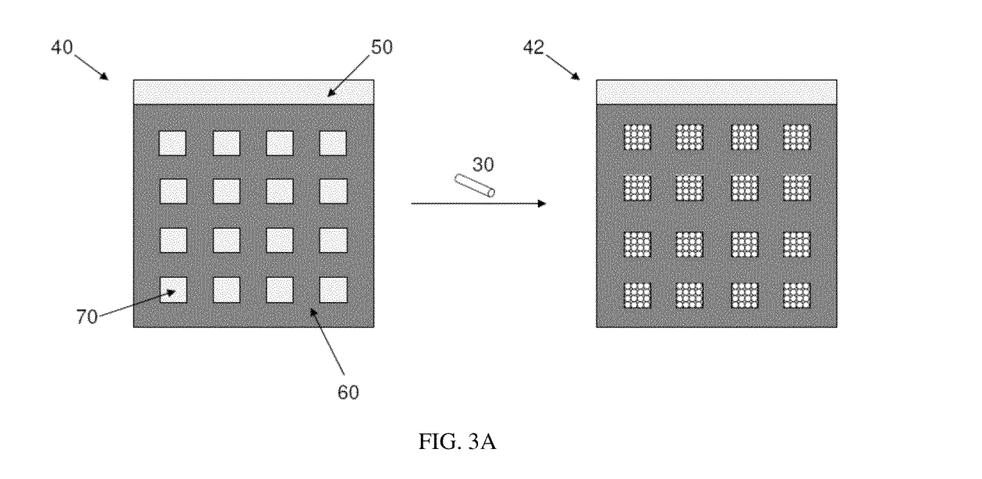

The assembly may be formed on a surface of a substrate. In some cases, the assembly may be formed on at least a portion of the substrate, or on substantially all of the substrate surface. In some cases, the assembly may be formed on a plurality of portions of the substrate. For example, the assembly may be formed on a plurality of portions, each having a surface area of 1-10 microns$^2$, on a surface of a substrate. In some cases, the substrate may comprise a conductive material, i.e., the substrate may be an electrode, and the assembly of carbon nanotubes may be in electrical communication with the substrate. For example, as shown in FIGS. 3A-B, substrate 40 may comprise a conductive material 50 and a patterned material 60 in contact with a conductive material 50 such that a plurality of portions 70 are exposed. Substrate 40 may be contacted with a mixture comprising carbon nanotubes 30. Upon application of an electric field, the carbon nanotubes may be oriented in substantially the same orientation and may form an assembly on the surface of substrate 40. The assembly may be formed on portions 70 of substrate 40.

In one set of embodiments, the substrate may be a cathode, and the method may to involve immersing the cathode and an anode in the mixture comprising the carbon nanotubes such that, upon application of a voltage to the electrodes, the carbon nanotubes may be aligned and drawn within the space between the electrodes. Deposition of the carbon nanotubes on the surface of the cathode may be observed by monitoring the current between the two electrodes, which may rise as a function of carbon nanotube deposition.

Methods of the invention may advantageously achieve formation of aligned, carbon nanotubes assemblies upon application of relatively low voltages. In some cases, the method may comprise exposing the mixture and a substrate to an electric field by application of a voltage of 50 volts or less, 25 volts or less, 10 volts or less, 5 volts or less or, in some cases, 3 volts or less, to the mixture. In some embodiments, the method may comprise application of a voltage between 1-3 volts to the mixture. Methods of the invention may also provide the ability to rapidly form carbon nanotube assemblies over large surfaces. In some cases, carbon nanotube deposition may be substantially complete in 60 minutes or less, 45 minutes or less, 30 minutes or less, 15 minutes or less, or 10 minutes or less.

The present invention also provides methods of generating an emission, such as a field emission. For example, the method may comprise providing a field emission device comprising an electrode as described herein, and generating a field emission signal from the electrode. In some cases, the field emission signal may be generated upon application of an electric field to the devices.

Figure 4:
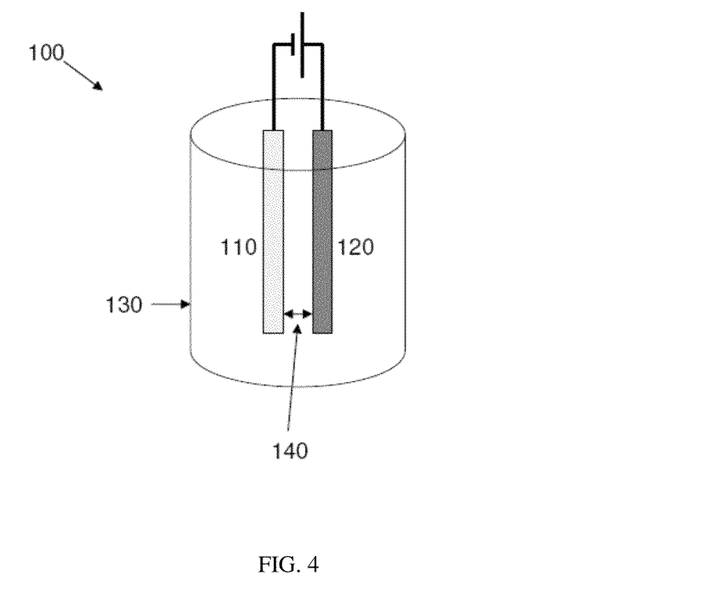
FIG. 4 shows a schematic representation of two electrodes immersed in a mixture of carbon nanotubes, according to one embodiment of the invention.

The field emission device may comprise an assembly of carbon nanotubes formed on the surface of a cathode, which may be used in combination with an anode and, optionally additional electrodes (e.g., a gate electrode). As show in FIG. 4, field emission device 100 may comprise cathode 110 comprising an assembly of carbon nanotubes and anode 120 comprising a luminescent material placed in an apparatus 120. Cathode 100 and anode 120 may be arranged to face each other such that the assembly of carbon nanotubes faces the luminescent material. The electrodes may be separated by a distance 140. In some embodiments, the distance may be 100 mm or less, 50 mm, or less, 10 mm or less, 5 mm or less, or, in some cases, 2 mm or less. In some cases, the distance between the electrodes may be 1-2 mm. Application of a voltage (e.g., a voltage greater than the voltage applied to form the assembly) to the electrodes may generate an to emission of electrons from cathode 110. The electrons may be focused in the direction of anode 120 and may interact with the luminescent material to produce a field emission. That is, the luminescent material may be excited by electrons emitted from the cathode to the anode. The emission of electrons may also interact with the surrounding polymeric support material, for example, by injecting charge into the polymer support material, further enhancing the performance of the device.

Devices of the invention may advantageously generate a field emission upon exposure to a relatively low operating voltage. In some embodiments, the emission of electrons may be generated by application of a voltage of 100 volts or less, 75 volts or less, 50 volts or less, 25 volts or less, or, in some cases, 10 volts or less, 5 volts of less, 3 volts or less, and the like, to the electrode.

Field emission devices of the invention may be manufactured in various arrangements, including as planar field emission devices. For example, the device may be arranged such that the carbon nanotubes are oriented in a substantially planar (e.g., lateral, parallel) configuration with respect to a substrate, wherein an electron emission generated by the carbon nanotubes may be emitted in a direction substantially non-perpendicular (e.g., parallel) to the substrate surface. In some embodiments, the device may be arranged such that the carbon nanotubes are oriented in a substantially non-planar (e.g., vertical, non-parallel) configuration with respect to a substrate, wherein an electron emission generated by the carbon nanotubes maybe emitted in a direction that is substantially non-parallel (e.g., substantially perpendicular) to the substrate surface. It should be understood that other device configurations may be utilized within the context of the invention.

Devices (e.g., field emission devices) of the invention may further comprise additional components to suit a particular application. In some cases, an electrically insulating material, a dielectric material, a protective material, and/or a buffer material may be arranged between the cathode and anode. In one embodiment, an electrically insulating material layer may be patterned on the surface of a cathode such that only a plurality of portions of the cathode may be exposed to the anode. In some cases, a porous material (or a material altered to become porous) may be used to form or to modify at least a portion of any of the components of the invention. As used herein, a "porous" material is defined as a material having a sufficient number of pores or interstices such that a material may be easily crossed or permeated by, for example, a fluid or mixture of fluids. Devices of the invention may also comprise protective materials arranged to, for example, reduce or prevent separation or delamination of any components with respect to each other. Components of the devices may be produced by known methods, including photolithography, sputtering, casting (e.g., spin-casting, drop-casting, etc.), deposition (e.g., chemical vapor deposition), or the like. Those of ordinary skill in the art would be able to select and manufacture various device components suitable for use in a particular application.

Devices of the invention may be useful in various applications, including display applications. For example, an electrode pair as described herein may form an individually addressable picture element (e.g., "pixel"). In some embodiments, devices of the invention may be useful for inexpensive and disposable displays, using expendable materials as the polymer support material surrounding the carbon nanotubes. Alternatively, the devices may be useful as long term operating devices, utilizing polymer support material that may be capable of undergoing reversible ionization and emission. Full color displays, conformal displays, flat panel displays, white light-emitting devices, liquid crystal displays (LCDs), plasma display panels (PDPs), and field emission displays (FEDs). Additionally, the present invention may be useful as backlights for displays and flat plane lighting for room lighting.

As described herein, the term "carbon nanotube" refer to a substantially cylindrical molecule comprising a fused network of aromatic rings. In some cases, carbon nanotubes may resemble a sheet of graphite rolled up into a seamless cylindrical structure. Carbon nanotubes comprise primarily six-membered rings, but it should be understood that, in some cases, carbon nanotubes may also comprise rings other than six-membered rings. Typically, at least one end of the carbon nanotube may be capped, i.e., with a curved or nonplanar aromatic group. Carbon nanotubes may have a diameter of the order of nanometers and a length on the order of millimeters, resulting in an aspect ratio greater than 100, 1000, 10,000, or greater. The term "carbon nanotube" includes single-walled nanotubes (SWNTs), multi-walled nanotubes (MWNTs) (e.g., concentric carbon nanotubes), inorganic derivatives thereof, and the like. In some embodiments, the carbon nanotube is a single-walled carbon nanotube. In some cases, the carbon nanotube is a multi-walled carbon nanotube (e.g., a double-walled carbon nanotube). In some case, the carbon nanotube may exhibit metallic and/or semiconductor properties.

The polymer support material, or precursor thereof, may be any material capable of supporting an assembly of carbon nanotubes as described herein. The polymer support material may be selected to be compatible with carbon nanotubes. In some cases, the compatibility may refer to solubility with respect to carbon nanotubes. In some cases, compatibility may refer to the affinity between the polymer support material and the carbon nanotubes. The precursor of the polymer support material may be a polymer material, a prepolymer material, or a combination thereof. In some cases, the precursor may be a polymer material which is not further polymerized in the method. In some cases, the precursor may comprise a prepolymer material, such that the method further comprising at least partially polymerizing the prepolymer material, thereby forming the assembly. For example, the precursor may comprise one or more monomeric species that may be polymerized at any step of the method. That is, the precursor may be polymerized prior to, during, or after formation of the assembly of carbon nanotube on the surface of the substrate.

In some cases, the precursor of the conducting polymer support comprises atoms or functional groups capable of forming a covalent bond with an adjacent polymer. The precursor may be selected to be inert (e.g., unreactive) to conditions which may generate a field emission, e.g., the precursor may not react when the device is placed under operating conditions to generate a field emission. For example, the precursor of the conducting polymer support material may not be reactive upon exposure to an electric field.

In some embodiments, the precursor may comprise silicon groups, acrylate groups, cyclic polycarbonates, or olefins (e.g., fluorine-containing olefins). Examples of suitable silicon groups include, but are not limited to, $SiCl_3$, $Si(OR)_3$, or $Si(OR)_4$, wherein R is alkyl or aryl.

In some cases, the polymer support material, or precursor thereof, may comprise one or more polymers. The term "polymers," as used herein, is given its ordinary meaning in the art and refers to extended molecular structures comprising a backbone (e.g., non-conjugated backbone, conjugated backbone) which optionally contain pendant side groups, where "backbone" refers to the longest continuous bond pathway of the to polymer. Polymers may also include oligomers. In some embodiments, the polymer comprises a non-conjugated polymer backbone. In some embodiments, at least a portion of the polymer is conjugated or pi-conjugated, i.e. the polymer has at least one portion along which electron density or electronic charge can be conducted, where the electronic charge is referred to as being "delocalized." Each p-orbital participating in conjugation can have sufficient overlap with adjacent conjugated p-orbitals. In one embodiment, at least a portion of the backbone is conjugated. In one embodiment, the entire backbone is conjugated and the polymer is referred to as a "conjugated polymer." Polymers having a conjugated pi-backbone capable of conducting electronic charge may also be referred to as "conducting polymers." In some cases, the conjugated pi-backbone may be defined by a plane of atoms directly participating in the conjugation, wherein the plane arises from a preferred arrangement of the p-orbitals to maximize p-orbital overlap, thus maximizing conjugation and electronic conduction. The polymer support material, or precursor thereof, may comprise organic and/or inorganic compounds and/or materials.

In some embodiments, at least a portion of the polymeric support material may be capable of forming a gel. As used herein, the term "gel" is given its ordinary meaning in the art and refers to polymer chains that may be crosslinked to form a network, wherein the network may be able to trap and contain fluids. Depending on the level of crosslinking, various properties of a particular gel can be tailored. For example, a highly crosslinked gel may generally be structurally strong and may resist releasing fluid under pressure. Those of ordinary skill in the art would be able to identify methods for modulating the degree of crosslinking in such gels. In some embodiments, the gel may be a hydrogel, including a crosslinkable hydrogel. The term "hydrogel" refers to water-soluble polymer chains that are crosslinked in the presence of water to form a network. Examples of polymers capable of forming hydrogels include, silicon-containing polymers, polyacrylamides, crosslinked polymers (e.g., polyethylene oxide, polyAMPS and polyvinylpyrrolidone), polyvinyl alcohol, acrylate polymers (e.g., sodium polyacrylate), and copolymers with an abundance of hydrophilic groups. In some cases, the gel may be an organogel, wherein the polymer network may be swollen by addition of an organic solvent.

In some cases, the polymer support material may comprise a sol-gel, or precursor thereof. A "sol-gel" refers to a colloidal suspension capable of being gelled to form a solid. In some cases, the sol-gel may be formed from a mixture of solid particles (e.g., inorganic salts) suspended in a liquid, wherein a series of reactions including hydrolysis and polymerization reactions may be performed to form a colloidal suspension. Sol-gel processes and materials are known to those of ordinary skill in the art. For example, a sol-gel may be formed from a sol-gel precursor which comprises a chemical solution and/or colloidal particles, and may produce an integrated network of colloidal particles upon formation of the sol-gel. Non-limiting examples of sol-gel precursor materials include inorganic oxides or inorganic hydroxides which may generate metal-oxo or metal-hydroxo polymers, or inorganic metal salts or metal organic compounds. In some embodiments, the sol-gel may comprise silica.

In some embodiments, the polymer support material, or precursor thereof, may comprise at least one additive that may improve performance of the device. In some cases, the presence of an additive may enhance the ability of the polymer support material to stabilize the assembly and/or orientation of carbon nanotubes. In some cases, incorporation of one or more additives with the polymer support material, or precursor thereof, may provide physical support to the assembly of carbon nanotubes, i.e., may occupy the physical space between individual carbon nanotubes to stabilize the assembly, along with the polymer support material. In some cases, one or more additives may be used to enhance the rigidity of the polymer support material, and may aid in maintaining the alignment of the carbon nanotubes in the device. Some non-limiting examples of such additives include organic and inorganic molecules and/or complexes, metal ions or complexes, organic or inorganic particles, biological molecules, polymers (e.g., oligomers, dendritic polymers), fibers, fillers, pigments, plasticizers, stabilizers, clarifiers, nucleating agents, compatibilizers, and the like. In some embodiments, the additive may comprise silica.

In some cases, the polymer support material may be selected to be a conductive material, such that the polymer support material may interact with the carbon nanotubes. In some instances, a device which comprises a conductive polymer support material capable of integrally supporting an assembly of carbon nanotubes, as described herein. For example, the polymer support material may be a conducting polymer, including polyaniline, polythiophene, polypyrrole, polyphenylene, polyarylene, poly(bisthiophene phenylene), a ladder polymer, poly(arylene vinylene), poly(arylene ethynylene), metal derivatives thereof, or substituted derivatives thereof. In some embodiments, the polymer support material may be polythiophene or a substituted derivative thereof. In an illustrative embodiment, the polymer is poly(3-hexylthiophene).

As used herein, the term "mixture" may refer to any combination of materials, such as combinations of solids, liquids, and/or gases. Mixtures may include a combination of a solid material with a liquid to form a solutions, suspension, emulsion, or dispersion. In some cases, the mixture is a dispersion comprising carbon nanotubes, a precursor of a polymer support material, and a fluid carrier.

The substrate can be any material capable of supporting an assembly of carbon nanotubes as described herein. That is, the substrate may be any material to which carbon nanotubes and/or a polymer support material, or precursor thereof, may adhere. The substrate material may be selected to have a thermal coefficient of expansion similar to those of the other components of the device to promote adhesion and prevent separation of the device components at various temperatures. In some instances, materials with dissimilar thermal expansion coefficients may expand and contract at different rates and amounts with changes in temperature, which can cause stress and separation of the device components.

In some cases, the substrate may comprise an electrically conductive material. In some cases, the substrate may comprise a material coated with an electrically conductive material, such that the carbon nanotube assembly may be formed in contract with the electrically conductive material. Examples of materials suitable for use as a substrate include, but are not limited to, metals, such as nickel, chromium, gold, molybdenum, tungsten, platinum, titanium, aluminum, copper, palladium, silver, other metals and/or metal compounds, alloys thereof, intermetallic compounds thereof, and the like. Other materials may also be useful, including indium tin oxide (ITO).

The substrate may also comprise a flexible material, such as plastics (e.g., polymer), polymer films, flexible glass films, metal foil, paper, woven materials, combinations thereof, and the like. The substrate may be a flexible material coated with an electrically conductive material, for example. In some cases, the assembly of carbon nanotubes may be arranged between two flexible substrates.

The substrate may be prepared, for example, by one of a number of micromachining methods known to those skilled in the art. Examples of such methods include, for instance, photofabrication, etching, electrodischarge machining, electrochemical machining, laser beam machining, wire electrical discharge grinding, focused ion beam machining, micromilling, micro-ultrasonic machining, and micropunching. The dimensions of the substrate may be any length, width, and thickness that is desired for a particular end use and may be rectangular, circular or otherwise shaped.

As described herein, devices of the invention may comprise a luminescent material, wherein the luminescent material may be any material capable of generating an emission. As used herein, an emitted radiation or "emission" may be luminescence emission, in which "luminescence" is defined as an emission of ultraviolet or visible radiation. Specific types of luminescence include fluorescence, in which a time interval between absorption and emission of visible radiation ranges from $10^{-12}$ to $10^{-7}$ s, phosphorescence, other types of luminescence, and the like. For example, the emission may be "chemiluminescence," which refers to emission of radiation due to a chemical reaction, or "electrochemiluminescence," which refers to emission of radiation due to electrochemical reactions. In some cases, the emission may be fluorescence emission. Other types of luminescence include cathodoluminescence, photoluminescence and electroluminescence which, respectively, involve excitation by electrons, light, and electric fields. In some cases, the luminescent material may be a phosphor, for example. As used herein, a "phosphor' is given its ordinary meaning in the art and refers to a material capable of emitting a phosphorescent signal upon excitation. In some cases, the phosphor may emit visible light or broadband light. Many materials that are suitable as cathodoluminescence phosphors are also suitable as electroluminescence phosphors. Examples of phosphors include, but are not limited to, metals, metal compounds, oxides thereof, alloys thereof, intermetallic compounds thereof, polymers, and the like. Typically, a combination of phosphors corresponding to red, blue, and green colors, optionally with additional phosphors, may be utilized.

EXAMPLES

Example 1

Figure 5:
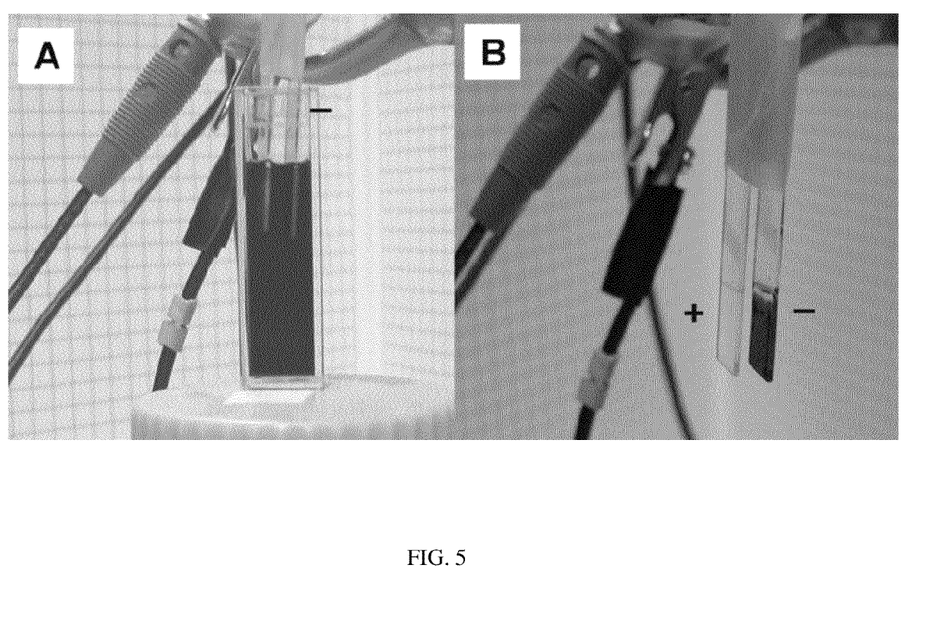
FIGS. 5A-B are photographs showing various steps in a process for formation of an assembly of carbon nanotubes, according to one embodiment of the invention.

Single-walled carbon nanotubes were purchased from Carbon Nanotechnologies Inc. (CNI Lot #R0204). The carbon nanotubes were combined with high molecular weight poly (3-hexylthiophene), a polymeric surfactant, to form a stable carbon nanotube suspension. Next, an anode and a cathode (e.g., a gold cathode), spaced 1-2 mm apart, were immersed within the suspension, as shown by the photograph in FIG. 5A. Using an Autolab electrochemical station, a DC bias voltage (5 V) was applied to the suspension and substrate for nanotube deposition, with the cathode serving as the substrate. The deposition speed was 4 microns/second.

Figure 6A:
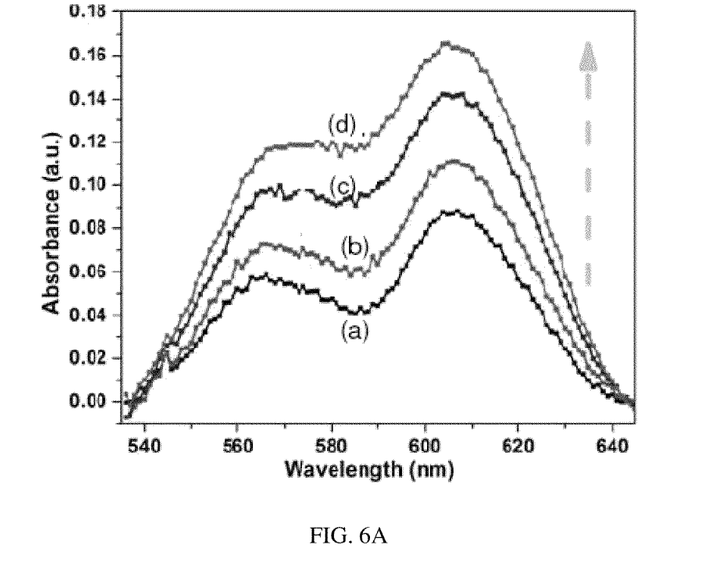
FIG. 6A shows the UV-visible absorption spectra of an assembly of carbon nanotubes after (a) 0 minutes, (b) 1 minute, (c) 10 minutes, and (d) 20 minutes of electrophoretic deposition.
Figure 6B:
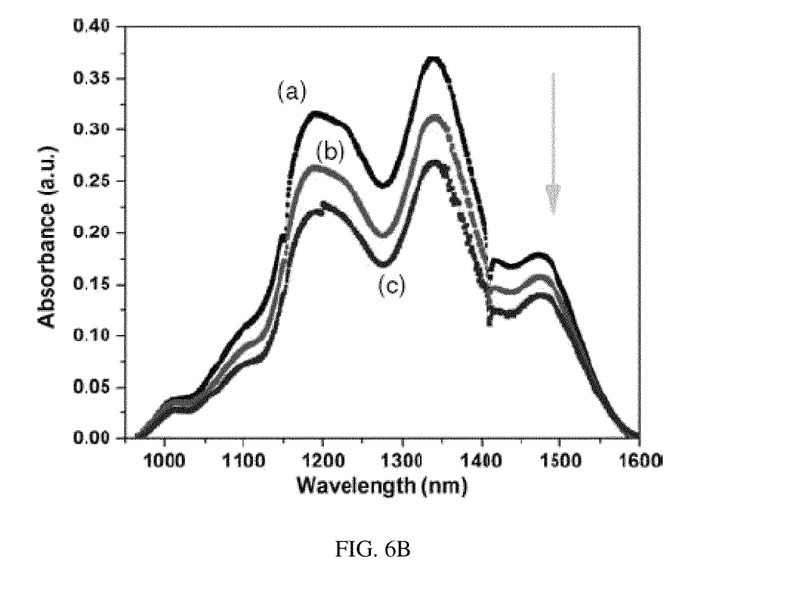
FIG. 6B shows the near-IR absorption spectra of an assembly of carbon nanotubes after (a) 0 minutes, (b) 1 minute, and (c) 10 minutes of electrophoretic deposition.

The absorption spectrum of the assembly of carbon nanotubes was measured between two ITO slides. FIG. 6A shows the UV-visible absorption spectra of the assembly of carbon nanotubes after (a) 0 minutes, (b) 1 minute, (c) 10 minutes, and (d) 20 minutes of electrophoretic deposition on the substrate. FIG. 6B shows the near-IR absorption spectra of an assembly of carbon nanotubes after (a) 0 minutes, (b) 1 minute, and (c) 10 minutes of electrophoretic deposition. The absorption peak observed at 540-640 nm is the absorption peak arising from the metallic nanotubes, the intensity of which was shown to increase as carbon nanotube deposition progressed. This indicated accumulation of metallic nanotubes occurred between the two electrodes, as shown by the photograph in FIG. 5B. The absorption spectra in the near-IR region was attributed to semiconducting carbon nanotubes. As shown in FIG. 6B, the intensity of the peaks decreased as carbon nanotube deposition progressed, indicating the concentration of the semiconducting carbon nanotube decreased as well.

Figure 7:
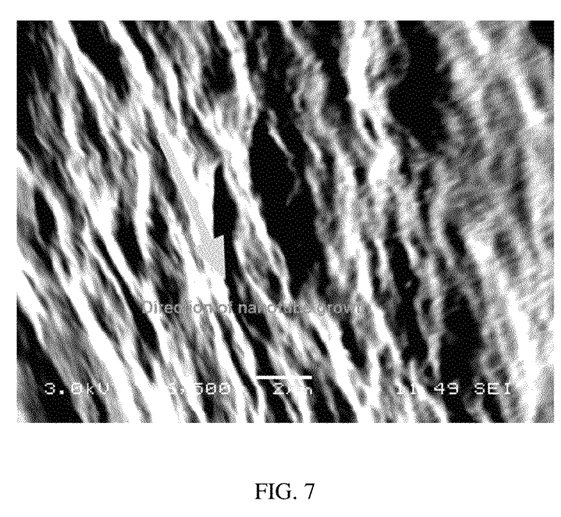
FIG. 7 shows an SEM image of carbon nanotubes aligned between two electrodes.

FIG. 7 shows an SEM image of the assembly of carbon nanotubes, which indicates that the carbon nanotubes are substantially aligned in the same direction.

Example 2

The resistance of a carbon nanotube assembly formed by electrophoretic deposition as described herein was compared to the resistance of a carbon nanotube assembly formed by spin-coating. The electrophoretically deposited assembly had a resistance of 30 Ohms, while the spin-coated assembly exhibited a resistance of approximately 3000 Ohms. Thus, the resistance of the electrophoretically deposited assembly comprising a high degree of aligned carbon nanotubes was 100 times greater than the spin-coated assembly comprising a relatively lower degree of aligned carbon nanotubes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. A method of generating an emission, comprising:
providing a field emission device comprising an electrode having a surface, and a plurality of carbon nanotubes in electrical communication with the surface, the carbon nanotubes supported by a polymer support material and in substantial alignment with each other with their major axis in non-parallel relation to the electrode surface such that at least 25% of carbon nanotubes are substantially contained within the polymer support material and do not contact other carbon nanotubes, wherein the field emission device is fabricated by contacting a substrate with a mixture comprising carbon nanotubes, a precursor of the polymer support material, and a fluid carrier; and
generating a field emission signal from the electrode.

2. A method as in claim 1, wherein the polymer support material comprises a conducting polymer.

3. A method as in claim 1, wherein the polymer support material comprises poly(3-hexylthiophene).

4. A method as in claim 1, wherein the polymer support material comprises a sol-gel.

5. A method as in claim 1, wherein the generating comprises application of a voltage of 100 volts or less to the electrode.

6. A method as in claim 1, wherein the electrode comprises gold.

7. A method as in claim 1, wherein the electrode is immersed in a fluid.

8. A method as in claim 7, wherein the fluid is a noble gas.

9. A method as in claim 7, wherein the fluid is substantially free of water and/or oxygen.

10. A method as in claim 1, wherein, upon application of an electric field, the device exhibits a conductivity at least 5 times lower than in an essentially identical device lacking the polymer support material, under essentially identical conditions.

11. A method as in claim 1, wherein the polymer support material comprises an additive.

12. A method as in claim 11, wherein the additive comprises silica.

13. An electrode for a field induced emission device, comprising:
an electrode comprising an assembly of carbon nanotubes and a polymer support material integrally connected to at least a portion of the carbon nanotubes such that the carbon nanotubes are substantially contained within the polymer support material, wherein the electrode is fabricated by contacting a substrate with a mixture comprising carbon nanotubes, a precursor of the polymer support material, and a fluid carrier,
wherein, upon application of an electric field, the device exhibits a conductivity at least five times lower than in an essentially identical device lacking the polymer, under essentially identical conditions.

14. An electrode as in claim 13, wherein the electrode is gold.

15. An electrode as in claim 13, wherein the electrode is immersed in a fluid.

16. An electrode as in claim 15, wherein the fluid is a noble gas.

17. An electrode as in claim 13, wherein, upon application of an electric field, the device exhibits a conductivity at least 10 times lower than in an essentially identical device lacking the polymer support material, under essentially identical conditions.

18. An electrode as in claim 13, wherein at least 25% of carbon nanotubes substantially contained within the polymer support material do not contact other carbon nanotubes.

19. A field induced emission device comprising an electrode as in claim 13.

20. A picture element comprising an electrode as in claim 13.

21. A display device comprising an electrode as in claim 13.

22. A display device as in claim 21, wherein the display device is a full color display, conformal display, flat panel display, liquid crystal display, plasma display, or field emission display.

23. A lighting device comprising an electrode as in claim 13.

24. An electrode as in claim 13, wherein the polymer support material comprises a conducting polymer.

25. An electrode as in claim 13, wherein the polymer support material comprises polyaniline, polythiophene, polypyrrole, polyphenylene, polyarylene, poly(bisthiophene phenylene), a ladder polymer, poly(arylene vinylene), poly(arylene ethynylene), metal derivatives thereof, or substituted derivatives thereof.

26. An electrode as in claim 13, wherein the polymer support material comprises poly(3-hexylthiophene).

27. An electrode as in claim 13, wherein the polymer support material comprises a sol-gel.

28. A method of forming an assembly of carbon nanotubes on a surface of a substrate, comprising:
providing a mixture comprising carbon nanotubes, a precursor of a polymer support material for the carbon nanotubes, and a fluid carrier;
contacting a substrate with the mixture;
exposing the mixture, on the substrate, to an electric field that orients the carbon nanotubes; and
forming the assembly on the surface of the substrate, comprising the carbon nanotubes supported by the polymer support material in an orientation wherein the long axes of the carbon nanotubes are substantially aligned and non-parallel to the surface of the substrate and at least 25% of carbon nanotubes are substantially contained within the polymer support material and do not contact other carbon nanotubes,
wherein the polymer support material comprises a conducting polymer.

* * * * *